United States Patent
Stewart et al.

(10) Patent No.: US 10,309,281 B2
(45) Date of Patent: *Jun. 4, 2019

(54) COORDINATED ENGINE AND EMISSIONS CONTROL SYSTEM

(71) Applicant: Honeywell spol, s.r.o., Prague (CZ)

(72) Inventors: Gregory Stewart, North Vancouver (CN); Jaroslav Pekar, Pacov (CZ); Daniel Pachner, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,799

(22) Filed: Apr. 19, 2017

(65) Prior Publication Data

US 2017/0218815 A1   Aug. 3, 2017

Related U.S. Application Data (63) Continuation of application No. 13/236,217, filed on Sep. 19, 2011, now Pat. No. 9,677,493.

(51) Int. Cl.
*F01N 3/20* (2006.01)
*F02D 41/02* (2006.01)
(Continued)

(52) U.S. Cl.
CPC .............. *F01N 3/208* (2013.01); *F01N 9/005* (2013.01); *F02D 41/0235* (2013.01);
(Continued)

(58) Field of Classification Search
CPC ...... F01N 3/208; F01N 9/005; F02D 41/0235; F02D 41/266; F02D 2250/36; F02D 2041/1412; Y02T 10/24; Y02T 10/47
(Continued)

(56) References Cited

U.S. PATENT DOCUMENTS

| 3,744,461 A | 7/1973 | Davis |
| 4,005,578 A | 2/1977 | McInerney |

(Continued)

FOREIGN PATENT DOCUMENTS

| CN | 102063561 | 5/2011 |
| CN | 102331350 | 1/2012 |

(Continued)

OTHER PUBLICATIONS

"Model Predictive Control Toolbox Release Notes," The Mathworks 24 pages, Oct. 2008.

(Continued)

*Primary Examiner* — Thai Ba Trieu
*Assistant Examiner* — Diem Tran
(74) *Attorney, Agent, or Firm* — Seager, Tufte & Wickhem, LLP (57) ABSTRACT

A system for reducing environmentally harmful emissions from an internal combustion engine. The system may incorporate an exhaust after-treatment device. The exhaust after-treatment device may use selective catalytic reduction to remove certain emissions from the exhaust of the engine. Urea solution may be inserted into the exhaust emissions, which is decomposed to ammonia to become a reduction agent for reduction of NOx in the emissions. The engine may be managed by a controller and the exhaust after-treatment device may be managed by another controller. These controllers may be cascaded, or be managed by a third controller that provides hierarchical or coordinated control of engine performance and emissions reduction. The engine and the exhaust after-treatment device may be modeled to aid in designing and building a system for coordinated control of an actual engine and a selective catalytic reduction after-treatment device. The controllers may be predictive model controllers.

19 Claims, 6 Drawing Sheets

(51) Int. Cl.
 *F01N 9/00* (2006.01)
 *F02D 41/26* (2006.01)
 *F02D 41/14* (2006.01)

(52) U.S. Cl.
 CPC ....... *F02D 41/1401* (2013.01); *F02D 41/266* (2013.01); *F01N 2610/02* (2013.01); *F01N 2900/04* (2013.01); *F01N 2900/1402* (2013.01); *F02D 2041/1412* (2013.01); *F02D 2041/1433* (2013.01); *F02D 2250/36* (2013.01); *Y02T 10/24* (2013.01); *Y02T 10/47* (2013.01)

(58) Field of Classification Search
 USPC .......................................... 60/286, 301, 303
 See application file for complete search history.

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamei et al. |
| 4,671,235 A | 6/1987 | Hosaka |
| 4,677,559 A | 6/1987 | Van Bruck |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong |
| 6,048,628 A | 4/2000 | Hillmann et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Fruedenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,349 B1 | 1/2001 | Kolmanovsky et al. |
| 6,178,743 B1 | 1/2001 | Hirota et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,324 B1 | 11/2001 | Kakuyama et al. |
| 6,321,538 B2 | 11/2001 | Hasler |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,803 B1 | 5/2002 | Surnilla et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 10/2002 | Asik et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,546,329 B2 | 4/2003 | Bellinger |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |

(56) References Cited

U.S. PATENT DOCUMENTS

| | | |
|---|---|---|
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,596 B2 | 12/2003 | Kawashima et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Surnilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,823,675 B2 | 11/2004 | Brunell et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,837,042 B2 | 1/2005 | Colignon et al. |
| 6,839,637 B2 | 1/2005 | Moteki et al. |
| 6,849,030 B2 | 2/2005 | Yamamoto et al. |
| 6,857,264 B2 | 2/2005 | Ament |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,050,863 B2 | 5/2006 | Mehta et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kitah et al. |
| 7,067,319 B2 | 6/2006 | Wills et al. |
| 7,069,903 B2 | 7/2006 | Surnilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Surnilla |
| 7,111,455 B2 | 9/2006 | Okugawa et al. |
| 7,113,835 B2 | 9/2006 | Boyden et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,164,800 B2 | 1/2007 | Sun |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |
| 7,349,776 B2 | 3/2008 | Spillane et al. |
| 7,357,125 B2 | 4/2008 | Kolavennu |
| 7,375,374 B2 | 5/2008 | Chen et al. |
| 7,376,471 B2 | 5/2008 | Das et al. |
| 7,383,118 B2 | 5/2008 | Imai et al. |
| 7,380,547 B1 | 6/2008 | Ruiz |
| 7,389,773 B2 | 6/2008 | Stewart et al. |
| 7,392,129 B2 | 6/2008 | Hill et al. |
| 7,400,933 B2 | 6/2008 | Rawlings et al. |
| 7,398,149 B2 | 7/2008 | Ueno et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |

(56) References Cited

U.S. PATENT DOCUMENTS

| | | | |
|---|---|---|---|
| 7,447,554 B2 | 11/2008 | Cutler | |
| 7,467,614 B2 | 12/2008 | Stewart et al. | |
| 7,469,177 B2 | 12/2008 | Samad et al. | |
| 7,474,953 B2 | 1/2009 | Hulser et al. | |
| 7,493,236 B1 | 2/2009 | Mock et al. | |
| 7,505,879 B2 | 3/2009 | Tomoyasu et al. | |
| 7,505,882 B2 | 3/2009 | Jenny et al. | |
| 7,515,975 B2 | 4/2009 | Stewart | |
| 7,522,963 B2 | 4/2009 | Boyden et al. | |
| 7,536,232 B2 | 5/2009 | Boyden et al. | |
| 7,542,842 B2 | 6/2009 | Hill et al. | |
| 7,577,483 B2 | 8/2009 | Fan et al. | |
| 7,587,253 B2 | 9/2009 | Rawlings et al. | |
| 7,591,135 B2 | 9/2009 | Stewart | |
| 7,599,749 B2 | 10/2009 | Sayyarrodsari et al. | |
| 7,599,750 B2 | 10/2009 | Piche | |
| 7,603,185 B2 | 10/2009 | Stewart et al. | |
| 7,603,226 B2 | 10/2009 | Henein | |
| 7,627,843 B2 | 12/2009 | Dozorets et al. | |
| 7,630,868 B2 | 12/2009 | Turner et al. | |
| 7,634,323 B2 | 12/2009 | Vermillion et al. | |
| 7,634,417 B2 | 12/2009 | Boyden et al. | |
| 7,650,780 B2 | 1/2010 | Hall | |
| 7,668,704 B2 | 2/2010 | Perchanok et al. | |
| 7,676,318 B2 | 3/2010 | Allain | |
| 7,698,004 B2 | 4/2010 | Boyden et al. | |
| 7,702,519 B2 | 4/2010 | Boyden et al. | |
| 7,725,199 B2 | 5/2010 | Brackney | |
| 7,738,975 B2 | 6/2010 | Denison et al. | |
| 7,743,606 B2 | 6/2010 | Havlena et al. | |
| 7,748,217 B2 | 7/2010 | Muller | |
| 7,752,840 B2 | 7/2010 | Stewart | |
| 7,765,792 B2 | 8/2010 | Rhodes et al. | |
| 7,779,680 B2 | 8/2010 | Sasaki et al. | |
| 7,793,489 B2 | 9/2010 | Wang et al. | |
| 7,798,938 B2 | 9/2010 | Matsubara et al. | |
| 7,813,884 B2 | 10/2010 | Chu et al. | |
| 7,826,909 B2 | 11/2010 | Attarwala | |
| 7,831,318 B2 | 11/2010 | Bartee et al. | |
| 7,840,287 B2 | 11/2010 | Wojsznis et al. | |
| 7,844,351 B2 | 11/2010 | Piche | |
| 7,844,352 B2 | 11/2010 | Vouzis et al. | |
| 7,846,299 B2 | 12/2010 | Backstrom et al. | |
| 7,850,104 B2 | 12/2010 | Havlena et al. | |
| 7,856,966 B2 | 12/2010 | Saitoh | |
| 7,860,586 B2 | 12/2010 | Boyden et al. | |
| 7,861,518 B2 | 1/2011 | Federle | |
| 7,862,771 B2 | 1/2011 | Boyden et al. | |
| 7,877,239 B2 | 1/2011 | Grichnik et al. | |
| 7,878,178 B2 | 2/2011 | Stewart et al. | |
| 7,891,669 B2 | 2/2011 | Araujo et al. | |
| 7,904,280 B2 | 3/2011 | Wood | |
| 7,905,103 B2 | 3/2011 | Larsen et al. | |
| 7,907,769 B2 | 3/2011 | Sammak et al. | |
| 7,930,044 B2 | 4/2011 | Attarwala | |
| 7,933,849 B2 | 4/2011 | Bartee et al. | |
| 7,958,730 B2 | 6/2011 | Stewart | |
| 7,970,482 B2 | 6/2011 | Srinivasan et al. | |
| 7,987,145 B2 | 7/2011 | Baramov | |
| 7,996,140 B2 | 8/2011 | Stewart et al. | |
| 8,001,767 B2 | 8/2011 | Kakuya et al. | |
| 8,019,911 B2 | 9/2011 | Dressler et al. | |
| 8,025,167 B2 | 9/2011 | Schneider et al. | |
| 8,032,235 B2 | 10/2011 | Sayyar-Rodsari | |
| 8,046,089 B2 | 10/2011 | Renfro et al. | |
| 8,046,090 B2 | 10/2011 | MacArthur et al. | |
| 8,060,290 B2 | 11/2011 | Stewart et al. | |
| 8,078,291 B2 | 12/2011 | Pekar et al. | |
| 8,108,790 B2 | 1/2012 | Morrison, Jr. et al. | |
| 8,109,255 B2 | 2/2012 | Stewart et al. | |
| 8,121,818 B2 | 2/2012 | Gorinevsky | |
| 8,145,329 B2 | 3/2012 | Pekar et al. | |
| 8,146,850 B2 | 4/2012 | Havlena et al. | |
| 8,157,035 B2 | 4/2012 | Whitney et al. | |
| 8,185,217 B2 | 5/2012 | Thiele | |
| 8,197,753 B2 | 6/2012 | Boyden et al. | |
| 8,200,346 B2 | 6/2012 | Thiele | |
| 8,209,963 B2 | 7/2012 | Kesse et al. | |
| 8,229,163 B2 | 7/2012 | Coleman et al. | |
| 8,245,501 B2 | 8/2012 | He et al. | |
| 8,246,508 B2 | 8/2012 | Matsubara et al. | |
| 8,250,857 B2 * | 8/2012 | Driscoll | F01N 3/208 60/274 |
| 8,265,854 B2 | 9/2012 | Stewart et al. | |
| 8,281,572 B2 | 10/2012 | Chi et al. | |
| 8,295,951 B2 | 10/2012 | Crisalle et al. | |
| 8,311,653 B2 | 11/2012 | Zhan et al. | |
| 8,312,860 B2 | 11/2012 | Yun et al. | |
| 8,360,040 B2 | 1/2013 | Stewart et al. | |
| 8,379,267 B2 | 2/2013 | Mestha et al. | |
| 8,387,368 B2 * | 3/2013 | Parmentier | F01N 3/208 60/276 |
| 8,396,644 B2 | 3/2013 | Kabashima et al. | |
| 8,418,441 B2 | 4/2013 | He et al. | |
| 8,453,431 B2 | 6/2013 | Wang et al. | |
| 8,473,079 B2 | 6/2013 | Havlena | |
| 8,478,506 B2 | 7/2013 | Grichnik et al. | |
| RE44,452 E | 8/2013 | Stewart et al. | |
| 8,504,175 B2 | 8/2013 | Pekar et al. | |
| 8,505,278 B2 | 8/2013 | Farrell et al. | |
| 8,543,362 B2 | 9/2013 | Germann et al. | |
| 8,555,613 B2 | 10/2013 | Wang et al. | |
| 8,571,689 B2 | 10/2013 | Macharia et al. | |
| 8,596,045 B2 | 12/2013 | Tuomivaara et al. | |
| 8,620,461 B2 | 12/2013 | Kihas | |
| 8,634,940 B2 | 1/2014 | Macharia et al. | |
| 8,649,884 B2 | 2/2014 | MacArthur et al. | |
| 8,649,961 B2 | 2/2014 | Hawkins et al. | |
| 8,694,197 B2 | 4/2014 | Rajagopalan et al. | |
| 8,700,291 B2 | 4/2014 | Hermann | |
| 8,762,026 B2 | 6/2014 | Wolfe et al. | |
| 8,763,377 B2 | 7/2014 | Yacoub | |
| 8,813,690 B2 | 8/2014 | Kumar et al. | |
| 8,825,243 B2 | 9/2014 | Yang et al. | |
| 8,839,967 B2 | 9/2014 | Schneider et al. | |
| 8,892,221 B2 | 11/2014 | Kram et al. | |
| 8,899,018 B2 | 12/2014 | Frazier et al. | |
| 8,904,760 B2 | 12/2014 | Mital | |
| 9,170,573 B2 | 10/2015 | Kihas | |
| 9,223,301 B2 | 12/2015 | Stewart et al. | |
| 9,243,576 B2 | 1/2016 | Yu et al. | |
| 9,677,493 B2 | 6/2017 | Stewart et al. | |
| 2002/0112469 A1 | 8/2002 | Kanazawa et al. | |
| 2002/0116104 A1 | 8/2002 | Kawashima et al. | |
| 2003/0089102 A1 | 5/2003 | Colignon et al. | |
| 2003/0150961 A1 | 8/2003 | Boelitz et al. | |
| 2003/0216855 A1 * | 11/2003 | Liang | F01N 3/208 701/114 |
| 2004/0006973 A1 | 1/2004 | Makki et al. | |
| 2004/0034460 A1 | 2/2004 | Folkerts et al. | |
| 2004/0083721 A1 | 5/2004 | Ketcher et al. | |
| 2004/0086185 A1 | 5/2004 | Sun | |
| 2004/0117766 A1 | 6/2004 | Mehta et al. | |
| 2004/0118107 A1 | 6/2004 | Ament | |
| 2004/0144082 A1 | 7/2004 | Mianzo et al. | |
| 2004/0165781 A1 | 8/2004 | Sun | |
| 2004/0199481 A1 | 10/2004 | Hartman et al. | |
| 2004/0221889 A1 | 11/2004 | Dreyer et al. | |
| 2004/0226287 A1 | 11/2004 | Edgar et al. | |
| 2005/0107895 A1 | 5/2005 | Pistikopoulos et al. | |
| 2005/0143952 A1 | 6/2005 | Tomoyasu et al. | |
| 2005/0171667 A1 | 8/2005 | Morita | |
| 2005/0187643 A1 | 8/2005 | Sayyar-Rodsari et al. | |
| 2005/0193739 A1 | 9/2005 | Brunell et al. | |
| 2005/0209714 A1 | 9/2005 | Rawlings et al. | |
| 2005/0210868 A1 | 9/2005 | Funabashi | |
| 2006/0047607 A1 | 3/2006 | Boyden et al. | |
| 2006/0111881 A1 | 5/2006 | Jackson | |
| 2006/0168945 A1 | 8/2006 | Samad et al. | |
| 2006/0265203 A1 | 11/2006 | Jenny et al. | |
| 2006/0282178 A1 | 12/2006 | Das et al. | |
| 2007/0101977 A1 | 5/2007 | Stewart | |
| 2007/0142936 A1 | 6/2007 | Denison et al. | |
| 2007/0144149 A1 | 6/2007 | Kolavennu et al. | |

(56) References Cited

U.S. PATENT DOCUMENTS

| | | | |
|---|---|---|---|
| 2007/0156259 | A1 | 7/2007 | Baramov et al. |
| 2007/0163244 | A1 | 7/2007 | Federle |
| 2007/0245714 | A1* | 10/2007 | Frazier .................... F01N 3/208 60/276 |
| 2007/0275471 | A1 | 11/2007 | Coward |
| 2008/0010973 | A1 | 1/2008 | Gimbres |
| 2008/0071395 | A1 | 3/2008 | Pachner |
| 2008/0097625 | A1 | 4/2008 | Vouzis et al. |
| 2008/0103747 | A1 | 5/2008 | Macharia et al. |
| 2008/0103748 | A1 | 5/2008 | Axelrud et al. |
| 2008/0104003 | A1 | 5/2008 | Macharia et al. |
| 2008/0109100 | A1 | 5/2008 | Macharia et al. |
| 2008/0125875 | A1 | 5/2008 | Stewart et al. |
| 2008/0132178 | A1 | 6/2008 | Chatterjee et al. |
| 2008/0183311 | A1 | 7/2008 | MacArthur et al. |
| 2008/0208778 | A1 | 8/2008 | Sayyar-Rodsari et al. |
| 2008/0244449 | A1 | 10/2008 | Morrison et al. |
| 2008/0264036 | A1 | 10/2008 | Bellovary |
| 2009/0005889 | A1 | 1/2009 | Sayyar-Rodsari |
| 2009/0008351 | A1 | 1/2009 | Schneider et al. |
| 2009/0043546 | A1 | 2/2009 | Srinivasan et al. |
| 2009/0087029 | A1 | 4/2009 | Coleman et al. |
| 2009/0131216 | A1 | 5/2009 | Matsubara et al. |
| 2009/0182518 | A1 | 7/2009 | Chu et al. |
| 2009/0198350 | A1 | 8/2009 | Thiele |
| 2009/0204233 | A1 | 8/2009 | Zhan et al. |
| 2009/0240480 | A1 | 9/2009 | Baramov |
| 2009/0254202 | A1 | 10/2009 | Pekar et al. |
| 2009/0287320 | A1 | 11/2009 | MacGregor et al. |
| 2009/0312998 | A1 | 12/2009 | Berckmans et al. |
| 2010/0017094 | A1 | 1/2010 | Stewart et al. |
| 2010/0038158 | A1 | 2/2010 | Whitney et al. |
| 2010/0050607 | A1 | 3/2010 | He et al. |
| 2010/0122523 | A1 | 5/2010 | Vosz |
| 2010/0126481 | A1 | 5/2010 | Will et al. |
| 2010/0204808 | A1 | 8/2010 | Thiele |
| 2010/0268353 | A1 | 10/2010 | Crisalle et al. |
| 2010/0281855 | A1* | 11/2010 | Sun .................... F01N 3/208 60/286 |
| 2010/0300069 | A1 | 12/2010 | Hermann et al. |
| 2010/0300070 | A1 | 12/2010 | He et al. |
| 2010/0305719 | A1 | 12/2010 | Pekar et al. |
| 2010/0327090 | A1 | 12/2010 | Havlena et al. |
| 2011/0029235 | A1 | 2/2011 | Berry |
| 2011/0046752 | A1 | 2/2011 | Piche |
| 2011/0056265 | A1 | 3/2011 | Yacoub |
| 2011/0060424 | A1 | 3/2011 | Havlena |
| 2011/0071653 | A1 | 3/2011 | Kihas |
| 2011/0087420 | A1 | 4/2011 | Stewart et al. |
| 2011/0125295 | A1 | 5/2011 | Bednasch et al. |
| 2011/0131017 | A1 | 6/2011 | Cheng et al. |
| 2011/0167025 | A1 | 7/2011 | Danai et al. |
| 2011/0257789 | A1 | 10/2011 | Stewart et al. |
| 2011/0264353 | A1 | 10/2011 | Atkinson et al. |
| 2011/0270505 | A1 | 11/2011 | Chaturvedi et al. |
| 2011/0301723 | A1 | 12/2011 | Pekar et al. |
| 2012/0010732 | A1 | 1/2012 | Stewart et al. |
| 2012/0024089 | A1 | 2/2012 | Couey et al. |
| 2012/0109620 | A1 | 5/2012 | Gaikwad et al. |
| 2012/0116649 | A1 | 5/2012 | Stewart et al. |
| 2013/0030554 | A1 | 1/2013 | Macarthur et al. |
| 2013/0067894 | A1 | 3/2013 | Stewart et al. |
| 2013/0111878 | A1 | 5/2013 | Pachner et al. |
| 2013/0111905 | A1 | 5/2013 | Pekar et al. |
| 2013/0131956 | A1 | 5/2013 | Thibault et al. |
| 2013/0204403 | A1 | 8/2013 | Zheng et al. |
| 2013/0338900 | A1 | 12/2013 | Ardanese et al. |
| 2014/0032189 | A1 | 1/2014 | Hehle et al. |
| 2014/0318216 | A1 | 10/2014 | Singh |
| 2014/0343713 | A1 | 11/2014 | Ziegler et al. |
| 2014/0358254 | A1 | 12/2014 | Chu et al. |
| 2015/0354877 | A1 | 12/2015 | Burns et al. |
| 2016/0216699 | A1 | 7/2016 | Pekar et al. |

FOREIGN PATENT DOCUMENTS

| | | |
|---|---|---|
| DE | 19628796 | 10/1997 |
| DE | 102009016509 | 10/2010 |
| EP | 0301527 | 2/1989 |
| EP | 0828063 A1 | 3/1998 |
| EP | 0950803 | 4/1999 |
| EP | 0877309 | 6/2000 |
| EP | 1134368 | 3/2001 |
| EP | 1180583 | 2/2002 |
| EP | 1225490 | 7/2002 |
| EP | 1273337 | 1/2003 |
| EP | 1425642 | 11/2005 |
| EP | 1676984 A1 | 7/2006 |
| EP | 1399784 | 10/2007 |
| EP | 1794339 | 7/2011 |
| EP | 1529941 | 11/2011 |
| EP | 2617975 | 7/2013 |
| EP | 2267559 | 1/2014 |
| EP | 2919079 | 9/2015 |
| JP | 2009250135 A1 | 10/2009 |
| JP | 2010282618 | 12/2010 |
| WO | 199845581 A1 | 10/1998 |
| WO | WO 0232552 | 4/2002 |
| WO | WO 02/097540 | 12/2002 |
| WO | WO 03/023538 | 3/2003 |
| WO | WO 2003/048533 | 6/2003 |
| WO | WO 2006/021437 | 3/2006 |
| WO | WO 2007/078907 | 7/2007 |
| WO | 2007120126 A2 | 10/2007 |
| WO | WO 2008/033800 | 3/2008 |
| WO | WO 2008/115911 | 9/2008 |
| WO | WO 2012/076838 | 6/2012 |
| WO | 2012092974 A1 | 7/2012 |
| WO | WO 2013/119665 | 8/2013 |
| WO | WO 2014/165439 | 10/2014 |
| WO | WO 2016/053194 | 4/2016 |

OTHER PUBLICATIONS

"MPC Implementation Methods for the Optimization of the Response of Control Valves to Reduce Variability," Advanced Application Note 002, Rev. A, 10 pages, 2007.

"SCR, 400-csi Coated Catalyst," Leading NOx Control Technologies Status Summary, 1 page prior to Feb. 2, 2005.

"Model Predictive Control," Wikipedia, pp. 1-5, Jan. 22, 2009. http://en.wikipedia.org/w/index.php?title=Special;Book&bookcmd=download&collection_id=641cd1b5da77cc22&writer=r1&return_to=Model predictive control, retrieved Nov. 20, 2012.

Advanced Petroleum-Based Fuels-Diesel Emissions Control (APBF-DEC) Project, "Quarterly Update," No. 7, 6 pages, Fall2002.

Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.

Amstuz, et al., "EGO Sensor Based Robust Output Control ofEGR in Diesel Engines," IEEE TCST, vol. 3, No. 1, 12 pages, Mar. 1995.

Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.

Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.

Baffi et al., "Non-Linear Model Based Predictive Control Through Dynamic Non-Linear Partial Least Squares,"Trans IChemE, vol. 80, Part A, pp. 75-86, Jan. 2002.

Bemporad et al., "Model Predictive Control Toolbox 3, User's Guide," Matlab Mathworks, 282 pages, 2008.

Bemporad et al., "The Explicit Linear Quadratic Regulator for Constrained Systems," Automatica, 38, pp. 3-20, 2002.

Bemporad, "Model Predictive Control Based on Linear Programming—The Explicit Solution," IEEE Transactions on Automatic Control, vol. 47, No. 12, pp. 1974-1984, Dec. 2002.

(56) References Cited

OTHER PUBLICATIONS

Bemporad, "Model Predictive Control Design: New Trends and Tools," Proceedings of the 45th IEEE Conference on Decision & Control, pp. 6678-6683, Dec. 13-15, 2006.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints*," SIAM J. Control and Optimization, vol. 20, No. 2, pp. 221-246, Mar. 1982.
Boom et al., "MPC for Max-Plus-Linear Systems: Closed-Loop Behavior and Tuning," Proceedings of the 2001 American Control Conference Arlington, VA., pp. 325-330, Jun. 2001.
Borrelli et al., "An MPC /Hybrid System Approach to Traction Control," IEEE Transactions on Control Systems Technology, vol. 14, No. 3, pp. 541-553, May 2006.
Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bunting, "Increased Urea Dosing Could Cut SCR Truck Running Costs", httn://www.automotiveworld.com/article/85897-increased-urea-dosing-could-cut-scr-truck-runnimz-costs, Automotive World, 3 pages, Feb. 24, 2011, printed Mar. 2, 2011.
Catalytica Energy Systems, "Innovative NOx Reduction Solutions for Diesel Engines," 13 pages, 3rd Quarter, 2003.
Chattetjee, et al. "Catalytic Emission Control for Heavy Duty Diesel Engines," JM, 46 pages, prior to Feb. 2, 2005.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
International Application Status Report for WO 2008/033800.
Search Report for Corresponding EP Application No. 11167549.2 dated Nov. 27, 2012.
U.S. Appl. No. 15/011,445, filed Jan. 29, 2016.
De Oliveira, "Constraint Handling and Stability Properties of Model Predictive Control," Carnegie Institute of Technology, Department of Chemical Engineering, Paper 197, 64 pages, Jan. 1, 1993.
De Schutter et al., "Model Predictive Control for Max-Min-Plus-Scaling Systems," Proceedings of the 2001 American Control Conference, Arlington, VA, pp. 319-324, Jun. 200 I.
Delphi, Delphi Diesel NOx Trap (DNT), 3 pages, Feb. 2004.
Diehl et al., "Efficient Numerical Methods for Nonlinear MPC and Moving Horizon Estimation," Int. Workshop on Assessment and Future Directions ofNMPC, 24 pages, Pavia, Italy, Sep. 5-9, 2008.
Dunbar, "Model Predictive Control: Extension to Coordinated Multi-Vehicle Formations and Real-Time Implementation," CDS Technical Report 01-016, 64 pages, Dec. 7, 2001.
GM "Advanced Diesel Technology and Emissions," powertrain technologies engines, 2 pages, prior to Feb. 2, 2005.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella, et al., "Control of Diesel Engines," IEEE Control Systems Magazine, pp. 53-71, Oct. 1998.
Havelena, "Componentized Architecture for Advanced Process Management," Honeywell International, 42 pages, 2004.
Hiranuma, et al., "Development ofDPF System for Commercial Vehicle Basic Characteristic and Active Regeneration Performance," SAE Paper No. 2003-01-3182, Mar. 2003.
Honeywell, "Profit Optimizer A Distributed Quadratic Program (DQP) Concepts Reference," 48 pages, prior to Feb. 2, 2005.

http:/ /www.not2fast. wry day .com/turbo/glossary /turbo/glossary. shtml, "N ot2Fast: Turbo Glossary," 22 pages, printed Oct. 1, 2004.
http://www.tai-cwv.com/sb1106.0.html, "Technical Overview—Advanced Control Solutions," 6 pages, printed Sep. 9, 2004.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-I 183 Mar. 2003.
Keulen et al., "Predictive Cruise Control in Hybrid Electric Vehicles," World Electric Journal, vol. 3, ISSN 2032-6653, May 2009.
Kolmanovsky, et al., "Issues in Modeling and Control of Intake Flow in Variable Geometry Turbocharged Engines", 18th IFIP Conf. System Modeling and Optimization, pp. 436-445, Jul. 1997.
Kulhavy, et al., "Emerging Technologies for Enterprise Optimization in the Process Industries," Honeywell, 12 pages, Dec. 2000.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Maciejowski, "Predictive Control with Constraints," Prentice Hall, Pearson Education Limited, 4 pages, 2002.
Mariethoz et al., "Sensorless Explicit Model Predictive Control of the DC-DC Buck Converter with Inductor Current Limitation," IEEE Applied Power Electronics Conference and Exposition, pp. 1710-1715,2008.
Marjanovic, "Towards a Simplified Infinite Horizon Model Predictive Controller," 6 pages, Proceedings of the 5th Asian Control Conference, 6 pages, Jul. 20-23, 2004.
Mayne et al., "Constrained Model Predictive Control: Stability and Optimality," Automatica, vol. 36, pp. 789-814, 2000.
Mehta, "The Application of Model Predictive Control to Active Automotive Suspensions," 56 pages, May 17, 1996.
Moore, "Living with Cooled-EGR Engines" Prevention Illustrated 3 pages, Oct. 3, 2004.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control—Sulfur Effects Project (DECSE) Summary of Reports," U.S. Department of Energy, 19 pages, Feb. 2002.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control." IEEE Transactions on Automatic Control, vol. 52, No. 6, 6 pages, 2007.
Patrinos et al., "A Global Piecewise Smooth Newton Method for Fast Large-Scale Model Predictive Control," Tech Report TR2010-02, National Technical University of Athens, 23 pages, 2010.
Qin et al., "A Survey of Industrial Model Predictive Control Technology," Control Engineering Practice, 11, pp. 733-764 2003.
Rajamani, "Data-based Techniques to Improve State Estimation in Model Predictive Control," Ph.D. Dissertation, 257 pages, 2007.
Rawlings, "Tutorial Overview of Model Predictive Control," IEEE Control Systems Magazine, pp. 38-52, Jun. 2000.
Salvat, et al., "Passenger Car Serial Application of a Particulate Filter System on a Common Rail Direct Injection Engine," SAE Paper No. 2000-01-0473, 14 pages, Feb. 2000.
Schauffele et al. "Automotive Software Engineering Principles, Processes, Methods, and Tools," SAE International, 10 pages, 2005.

(56) References Cited

OTHER PUBLICATIONS

Schutter et at, "Model Predictive Control for Max-Min-Plus-Scaling Systems," Proceedings of the 2001 American Control Conference, Arlington, VA, pp. 319-324, Jun. 2001.
Shamma, et al. "Approximate Set-Valued Observers for Nonlinear Systems," IEEE Transactions on Automatic Control, vol. 42, No. 5, May 1997.
Soltis, "Current Status ofNOx Sensor Development," Workshop on Sensor Needs and Requirements for PEM Fuel Cell Systems and Direct-Injection Engines, 9 pages, Jan. 25-26, 2000.
Stefanopoulou, et al,, "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the 4ih IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz 3 pages, 2009.
Storset, et al., "Air Charge Estimation for Turbocharged Diesel Engines," vol. 1 Proceedings of I the American Control Conference, 8 pages, Jun. 28-30, 2000.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The Math Works, "Model-Based Calibration Toolbox 2.1 Calibrate complex powertrain systems," 4 pages, prior to Feb. 2, 2005.
The Math Works, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.
Tondel et al., "An Algorithm for Multi-Parametric Quadratic Programming and Explicit MPC I Solutions," Automatica, 39, pp. 489-497, 2003.
Van Basshuysen et al., "Lexikon Motorentiechnik," (Dictionary of Automotive Technology) published by Vieweg Verlag, Wiesbaden 039936, p. 518,2004. (English Translation).
Van Den Boom et al., "MPC for Max-Plus-Linear Systems: Closed-Loop Behavior and Tuning," Proceedings of the 2001 American Control Conference, Arlington, VA, pp. 325-330, Jun. 2001.
Van Keulen et al., "Predictive Cruise Control in Hybrid Electric Vehicles," World Electric Vehicle Journal vol. 3, ISSN 2032-6653, pp. 1-11,2009.
Wang et al., "Fast Model Predictive Control Using Online Optimization," Proceedings of the 17th World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Wright, "Applying New Optimization Algorithms to Model Predictive Control," 5th International Conference on Chemical Process Control, 10 pages, 1997.
Zavala et al., "The Advance-Step NMPC Controller: Optimality, Stability, and Robustness," Automatica, vol. 45, pp. 86-93 2009.
Zeilinger et al., "Real-Time MPC Stability Through Robust MPC Design," Joint 48th IEEE Conference on Decision and Control and 28th Chinese Control Conference, Shanghai, P.R. China, pp. 3980-3986, Dec. 16-18, 2009.
Zelenka, et al., "An Active Regeneration as a Key Element for Safe Particulate Trap Use," SAE Paper No. 2001-0103199 13 pages, Feb. 2001.
Zhu, "Constrained Nonlinear Model Predictive Control for Vehicle Regulation," Dissertation, Graduate School of the Ohio State University, 125 pages, 2008.
EP12184343, Search Report, 9 pp., dated May 17, 2018.

\* cited by examiner

COORDINATED ENGINE AND EMISSIONS CONTROL SYSTEM

This application is a continuation of U.S. patent application Ser. No. 13/236,217, filed Sep. 19, 2011. U.S. patent application Ser. No. 13/236,217, filed Sep. 19, 2011, is hereby incorporated by reference.

BACKGROUND

The present disclosure pertains to environmentally harmful emissions and particularly to an approach to reduce such emissions from internal combustion engines.

SUMMARY

The disclosure reveals a system for reducing environmentally harmful emissions from an internal combustion engine. The system may incorporate an exhaust after-treatment device. The exhaust after-treatment device may use selective catalytic reduction to remove certain emissions from the exhaust of the engine. Urea solution may be inserted into the exhaust emissions, which is decomposed to ammonia to become a reduction agent for reduction of NOx in the emissions. The engine may be managed by a controller and the exhaust after-treatment device may be managed by another controller. These controllers may be cascaded, or be managed by a third controller that provides hierarchical or central coordinated control of engine performance and emissions reduction. The engine and the exhaust after-treatment device may be modeled to aid in designing and building a system for coordinated control of an actual engine and a selective catalytic reduction after-treatment device. The controllers may be predictive model controllers.

DESCRIPTION

Due to ongoing emissions legislation in many geographical regions, and for many applications, many diesel engines need to significantly limit the NOx emissions from the tailpipe. Selective catalytic reduction (SCR) may involve a NOx after-treatment device that actively injects urea solution into the exhaust stream which may decompose to ammonia for a catalyzed chemical reaction. However, control strategies need to be coordinated in order to achieve the maximum achievable performance—in terms of NOx emissions and vehicle fuel economy.

The present approach may coordinate the control of the engine and SCR device. Coordinated control of these two subcomponents may lead to very much reduced NOx emissions to meet strict clean air regulations and also improved vehicle fuel efficiency.

When two devices, an engine and an aftertreatment mechanism, are controlled independently, an engine control system may simply and generally always try to reduce the engine-out NOx as much as possible. This may often be done by a massive exhaust gas recirculation which is not necessarily optimal for soot emissions and fuel efficiency. It may often be thought, from an overall optimality point of view, that the engine control system rely on the aftertreatment mechanism to reduce NOx emissions. Instead, the engine control system should control the aftertreatment temperature to maximize its efficiency. This may be achieved virtually only by coordinated control.

The present approach may utilize modeling and control technology. First, models of the engine and after-treatment subsystems may be created. The models of the engine and exhaust after-treatment subsystems may track actual engine and exhaust after-treatment subsystems. From these models one or more multivariable controllers may be synthesized. A multi-variable controller may address the inherent interactions of an overall coordinated engine-SCR control system.

The present description may treat the models of the engine and exhaust after-treatment subsystems as actual subsystems.

Figure 1:
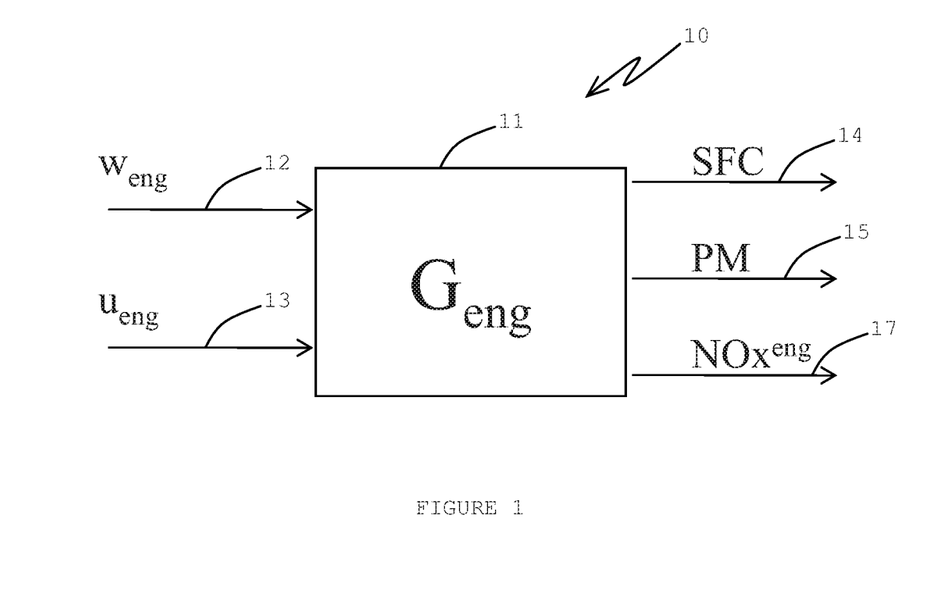
FIG. 1 is a diagram of a basic engine plant system.
Figure 3:
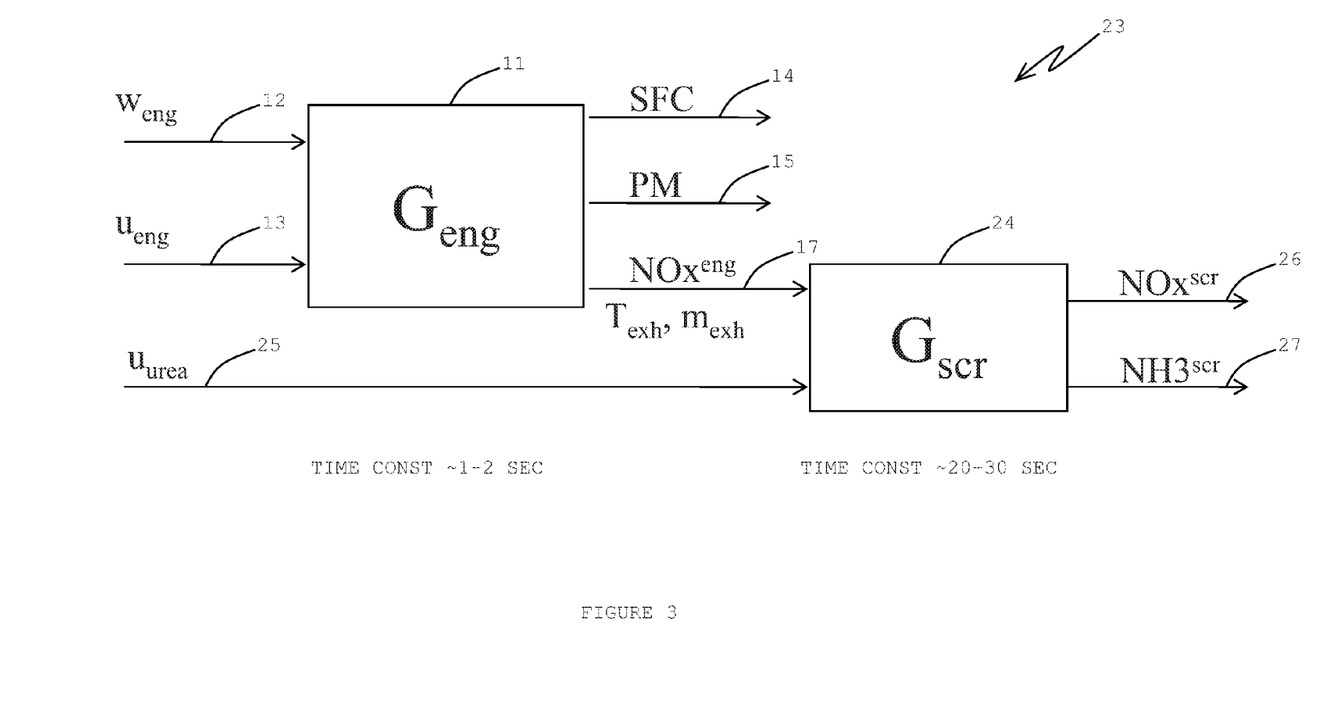
FIG. 3 is a diagram of a combined engine and selective catalyst reduction system.
Figure 4:
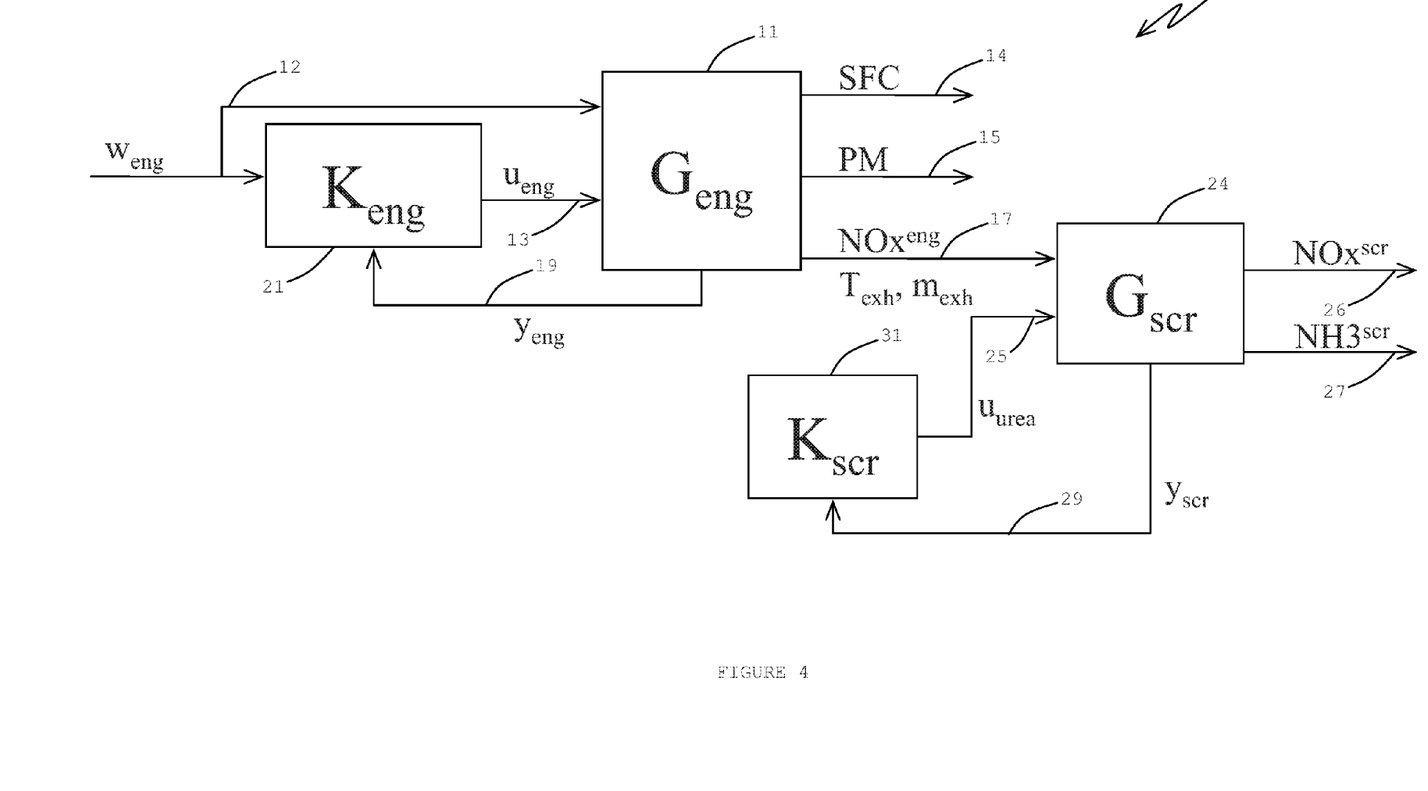
FIG. 4 is a diagram of an uncoordinated engine and selective catalyst reduction control system.
Figure 5:
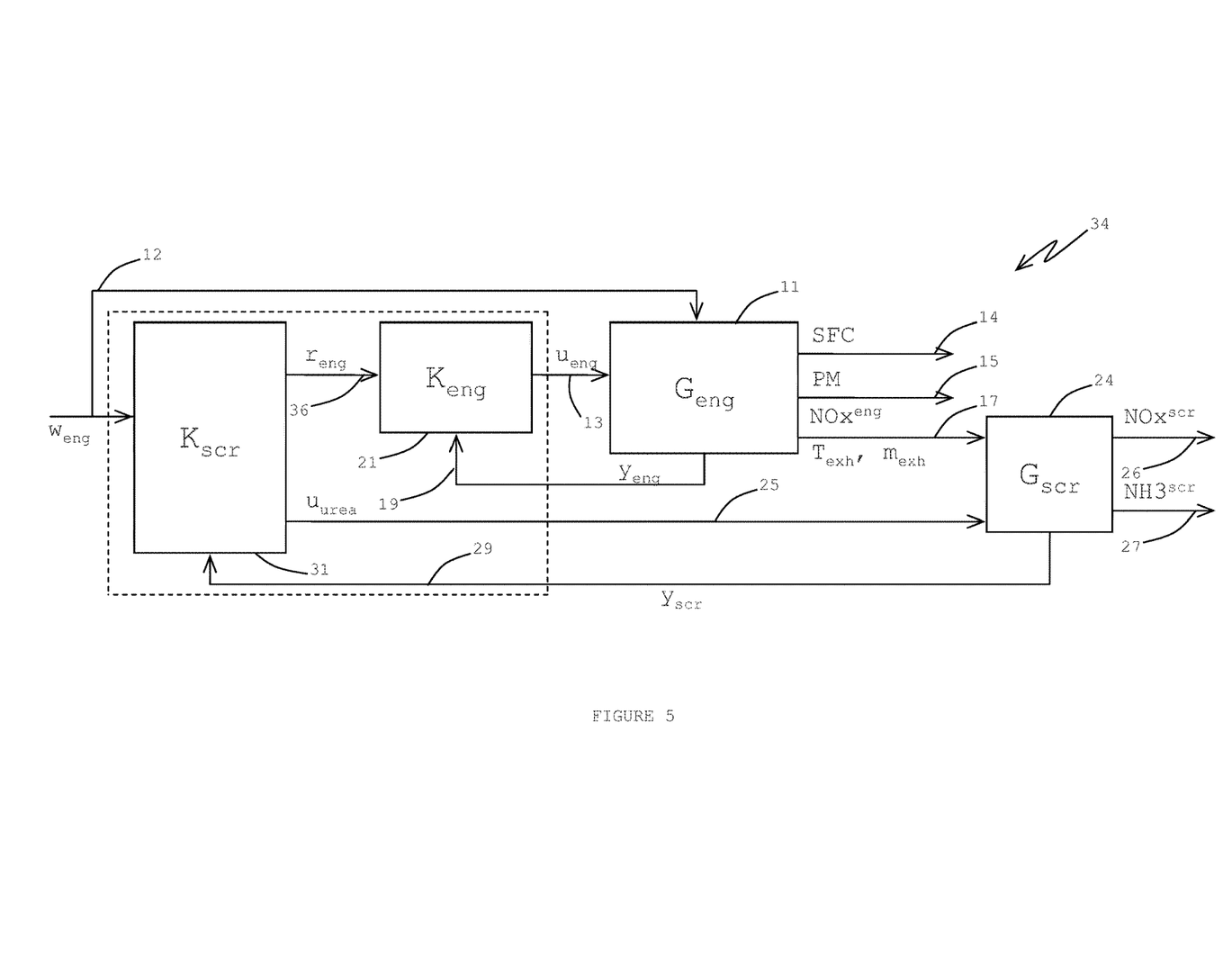
FIG. 5 is a diagram of a system having cascaded coordinated control.
Figure 6:
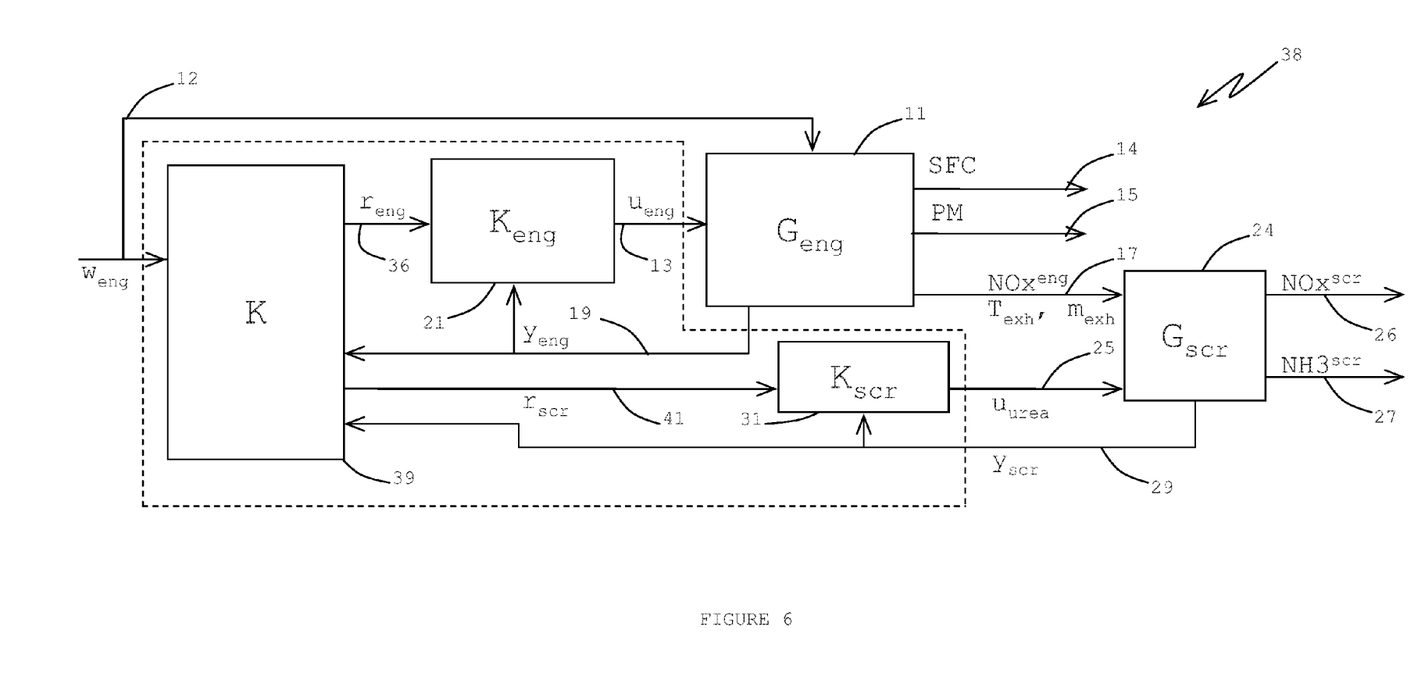
FIG. 6 is a diagram of a hierarchical coordinated control system.

A series of FIGS. 1-4 indicate some basic elements of an engine and emission control approaches which lead up to FIGS. 5 and 6 which show examples of the present system. FIG. 1 is a diagram of a basic engine plant model system 10. Input 12 ($w_{eng}$) may incorporate detected engine speed, fueling rate, ambient conditions, such as temperature and air pressure, and so on. Input 13 ($u_{eng}$) may incorporate signals to actuators on the engine (e.g., variable geometry turbine (VGT), exhaust gas recirculation (EGR), throttles, fuel injection specifications, variable valve actuation (VVA), and so on). "$u_{eng}$" may be regarded as one or more engine actuators. There may be a block ($G_{eng}$) 11 representing an engine plant model, such as a diesel engine with a turbocharger. An output 14 may be based on SFC (specific fuel consumption, for instance, in grams per kilowatt hour) of the engine. An output 15 may indicate a PM (particulate matter) output of the engine and output 17 may indicate a $NOx^{eng}$ (i.e., nitrogen oxides) output of the engine. NOx may be measured in parts per million.

Figure 2:
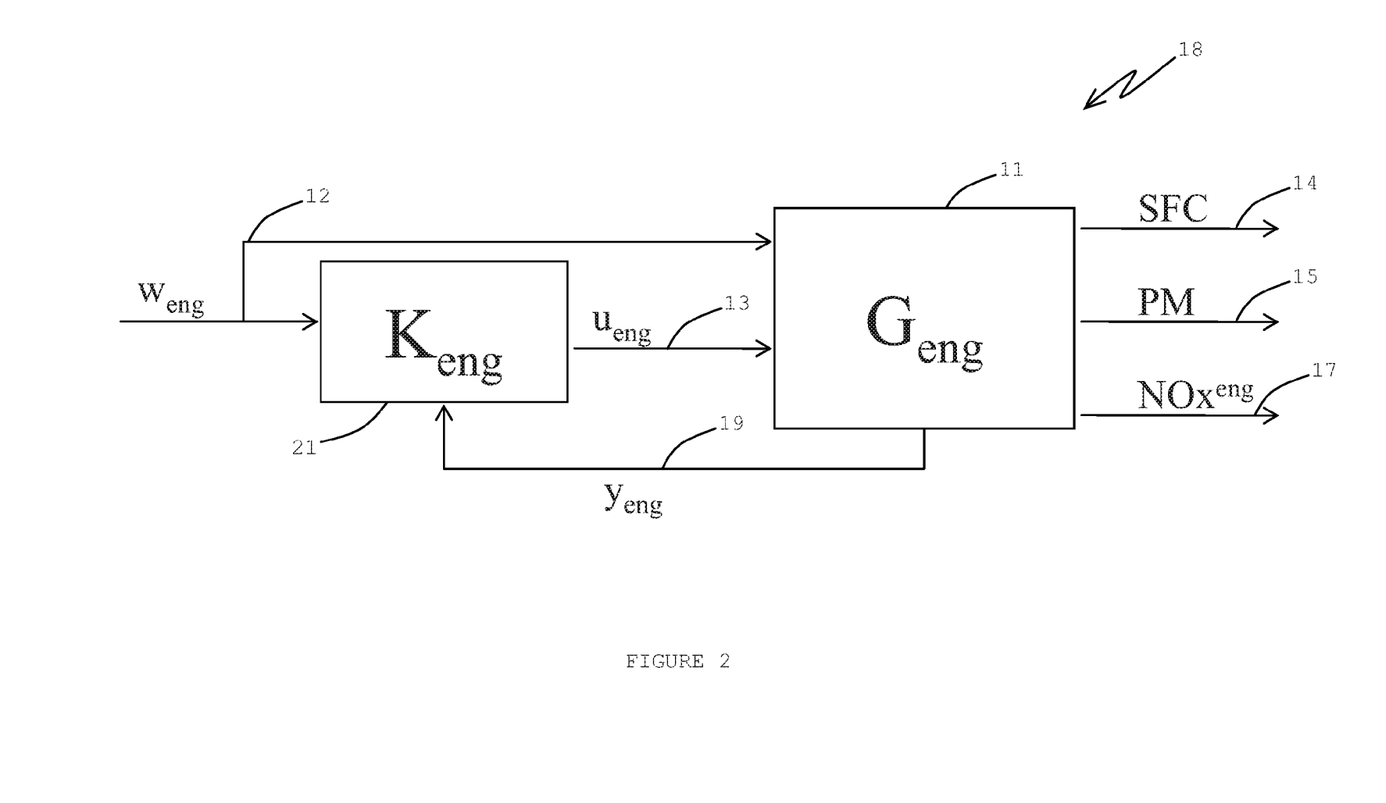
FIG. 2 is a diagram of a basic engine arrangement with control but no selective catalyst reduction.

FIG. 2 is a diagram of a basic engine arrangement 18 with control but no SCR. There may be a feedback 19 ($y_{eng}$) (engine sensors) from $G_{eng}$ 11 to a $K_{eng}$ block 21 which may represent an embedded computer. $y_{eng}$ 19 may incorporate signals from sensors for MAP, EGR flow, temperatures, NOx emissions, and so on. $K_{eng}$ controller 21 may incorporate one or more control algorithms. A signal 19 may represent the on-engine measurements. "$y_{eng}$" may be regarded as engine sensors. A control goal may be to control the various actuators to achieve engine specific goals such as tracking desired boost pressures, fresh and/or mass air flow, EGR flow, and so forth, and indirectly be responsible for providing trade offs among SFC, PM and NOx, and other items. Often a control goal may be to minimize SFC such that legal constraints on PM and NOx are satisfied. $U_{eng}$ 13 (engine actuators) may incorporate actuator signals from $K_{eng}$ controller 21 to $G_{eng}$ block 11.

FIG. 3 is a diagram of a combined engine and SCR plant system 23. With an addition of an SCR after-treatment device 24 to the basic engine plant model 11, one may change the NOx component of the engine outputs by adding an ammonia component (NH3). There may be a $w_{eng}$ input 12 and a $U_{eng}$ input 13 to engine ($G_{eng}$) block 11. The performance may in part be defined by SFC 14 and PM 15 from the $G_{eng}$ block 11. A signal 17 representing or indicating $NOx^{eng}$, $T_{exh}$ (exhaust temperature) and $m_{exh}$ (exhaust mass) may proceed from the $G_{eng}$ block 11 to an SCR after-treatment ($G_{scr}$) device 24. The $T_{exh}$ may be determined before an entry of the exhaust to device 24. System 23 may provide a $u_{urea}$ input signal 25 to $G_{scr}$ device block 24. "$u_{urea}$" may be regarded as a urea solution dosing actuator. Block 24 may have an output 26 of $NOx^{scr}$ and an output 27 of $NH3^{scr}$. Outputs 26 and 27 are the items of the system that may need to meet legal requirements relating to exhaust NOx emissions.

A time constant may be associated with the engine in block 11 and with the SCR device in block 24. The time constant of block 11 may be an amount of time (e.g., about 1-2 seconds) that is needed for changed inputs to block 11 to result in a certain amount (e.g., 63 percent) of stabilization of the response of the system to the inputs. The time constant of block 24 may be an amount of time (e.g., about 20-30 seconds) that the after-treatment device needs because of a temperature change caused by a change of inputs resulting in a change of exhaust.

Relative to the SCR device, a catalyst may be a part of the device (usually contained in a wash coat). What is injected to the exhaust gas may be a urea solution which is decomposed to ammonia and the ammonia is used as reduction agent for various chemical reactions (e.g., NOx reduction). Ammonia is adsorbed on the catalyst (e.g., a catalyst of a platinum-zeolite type)

FIG. 4 is a diagram of an uncoordinated engine and SCR control system 28, having portions of system 18 of FIG. 2 and system 24 of FIG. 3, and additionally a $K_{scr}$ block 31 in a feedback loop of $G_{scr}$ block 24 with a $y_{scr}$ signal 29 (SCR sensors) from $G_{scr}$ block 24 or after-treatment mechanism 24 to a $K_{scr}$ or controller block 31 and a $u_{urea}$ signal 25 input from controller block 31 to the $G_{scr}$ block 24 for controlling an amount of urea solution injected into the engine exhaust 17 in the after-treatment mechanism 24. "$y_{scr}$" may be regarded as SCR sensors. Such SCR sensors may be for upstream NOx (engine-out NOx), downstream NOx (tail-pipe-out NOx), downstream NH3, upstream/downstream temperatures, exhaust flow, and the like. Techniques for SCR control may have the $K_{scr}$ 31 act on information $y_{scr}$ 29 of the state of the exhaust 17 entering the $G_{scr}$ 24 or SCR device 24. The state of the exhaust entering device 24 may be some combination of NOx, $T_{exh}$ and/or $m_{exh}$. A state of the exhaust that is leaving the SCR device 24 may be some combination of NOx and/or NH3.

Looking at the "combined engine-SCR plant", a centralized MIMO controller appears to be a possible option. However, a dramatic difference in bandwidths (i.e., time constants of $G_{eng}$ block 11 and $G_{scr}$ block 24) may be a challenge, which suggests that a separated structure might be more practical. Generally, the SCR device 24 may decrease the engine out NOx, which could mean that there is extra capability in the engine controller $K_{eng}$ 21 to optimize the other items. Here, one may have a tradeoff where there is a making $NOx^{eng}$ higher to achieve a better SFC or vice versa.

The performance of the SCR device 24 may be governed by the urea solution dosing and also the properties of $NOx^{eng}$ (NOx concentration of exhaust gas), $T_{exh}$ (temperature of exhaust gas), and $m_{exh}$ (mass flow of exhaust gas) which influence the SCR device's states (temperature and NH3 coverage). The engine variables in turn may vary as a function of engine speed and fuel, ambient conditions, and engine actuators, which change much faster than a 20-30 second time constant of the $G_{scr}$ or SCR 24. The actuators relative to $u_{eng}$ may be responsible for governing engine functions in order to manipulate engine performance factors such as SFC and PM in addition to managing the SCR relevant variables of $NOx^{eng}$, $T_{exh}$, and $m_{exh}$.

So it seems that the $NOx^{eng}$, $T_{exh}$, $m_{exh}$ might be coordinated with a urea solution dosing to enhance the overall performance of the engine-SCR system 28, but one may need to carefully consider what aspects of the control to focus on. That is, one cannot necessarily expect to be able to hold $NOx^{eng}$, $T_{exh}$, and $m_{exh}$ at a desired setpoint for a very long time considering the dynamic needs of SCR 24 and the fact that the engine actuators of $G_{eng}$ 11 or engine plant model 11 also have to deliver engine performance.

FIG. 5 is a diagram of a system 34 with cascaded coordinated control which may be considered. Cascading controllers 31 and 21 may be a part of the system's control strategy. Implicit in controller 31 may be a supervisory controller. A $w_{eng}$ signal 12 may enter a $K_{scr}$ controller block 31 and a $G_{eng}$ engine block 11. A $r_{eng}$ signal 36 may go from the $K_{scr}$ block 31 to the $K_{eng}$ block 21. A $u_{eng}$ signal 13 for engine actuators may go from the $K_{eng}$ block 21 to the $G_{eng}$ block 11. A signal $y_{eng}$ 19 from engine sensors may have information fed back from the $G_{eng}$ block 11 to the $K_{eng}$ block 21. An output SFC signal 14 and a PM signal 15 may be output from the $G_{eng}$ block 11. A directly or indirectly measured $NOx^{eng}$, $T_{exh}$, $m_{exh}$ signal 17 may go from the $G_{eng}$ block 11 to a $G_{scr}$ block 24. The $K_{scr}$ block 31 may provide an output signal $u_{urea}$, 25 signal (actuator) for indicating an amount of urea solution to be injected into the SCR device $G_{scr}$ block 24. The $G_{scr}$ block 24 may feed back a $y_{scr}$ signal 29 with SCR sensor information about $G_{scr}$ 24 to the $K_{scr}$ block 31 for modification of setpoints, input parameters, speed, fuel, and so on, of the engine as indicated by $w_{eng}$ 12. The SCR device ($G_{scr}$ block 24) may output a $NOx^{scr}$ signal 26 and an $NH3^{scr}$ signal 27.

The $r_{eng}$ signal 36 may refer to the setpoints and input parameters for the engine controller ($K_{eng}$) 21. The SCR controller ($K_{scr}$) 31 may use the $r_{eng}$ signal 36 for actuation to assist in the SCR 24 control via the $NOx^{eng}$, $T_{exh}$ and $m_{exh}$ signal 17.

$K_{eng}$ block 21 and/or $K_{scr}$ block 31 may each represent a model predictive control (MPC) controller. If one assumes that $K_{scr}$ block 31 represents an MPC controller, then one may put constraints on the $r_{eng}$ signal 36 so that engine control goals, such as, for example, requirements on PM, SFC and $NOx^{eng}$, are respected. The present structure 34 may permit a use of the $r_{eng}$ signal 36 to enhance a slow transient response of the $K_{scr}$ block 31.

FIG. 6 is a diagram of a hierarchical coordinated control system 38. A $w_{eng}$ signal 12 may enter a K block 39 and a $G_{eng}$ block 11. A $r_{eng}$ signal 36 may go from the K block 39 to a $K_{eng}$ block 21. A $u_{eng}$ signal 13 may go from the $K_{eng}$ block 21 to the $G_{eng}$ block 11. A yea signal 19 may be fed back from the $G_{eng}$ block 11 to the $K_{eng}$ block 21. An output of the engine may include SFC 14 and a PM signal 15 as output from the $G_{eng}$ block 11. A $NOx^{eng}$, $T_{exh}$ and $m_{exh}$ signal 17 may go from the $G_{eng}$ block 11 to a $G_{scr}$ block 24. An $r_{scr}$ signal 41 may go from the K block 39 to a $K_{scr}$ block 31. A $u_{urea}$ signal 25 may go from the $K_{scr}$ block 31 to the $G_{scr}$ block 24. Outputs from the SCR device $G_{scr}$ block 24 may include a $NOx^{scr}$ signal 26 and an $NH3^{scr}$ signal 27.

The control strategy for system 38 of FIG. 6 may have a hierarchical structure with the controller $K_{scr}$ 31 dedicated to the $G_{scr}$ 24. Here, the K block 39 may be a supervisor controller or coordinator which manipulates the setpoints $w_{eng}$, $r_{eng}$, $r_{scr}$ and so on for the local controllers $K_{eng}$ 21 and $K_{scr}$ 31, so that the prescribed goals are achieved, i.e., namely, the requirements for $NOx^{scr}$, $NH3^{scr}$, PM, SFC, and so forth. K block 39, $K_{eng}$ block 21 and/or $K_{scr}$ block 31 may each represent an MPC controller.

Model predictive control (MPC) is a control approach that appears to have been successfully applied in many industrial control applications. MPC appears suitable for applications where it may be necessary dynamically coordinate several actuators to drive several controlled variables. Such systems may be known as multivariable. MPC appears able to include constraints on various signals in a control loop systematically. The ability to handle the constrained multivariable dynamical system in a systematic way may be the key factor which increases popularity of MPC.

MPC may use a dynamical model of the controlled system to predict future behavior of a controlled technology or process. Based on this prediction and based on defined optimality criteria, MPC may compute an optimal control signal by solving a constrained optimization problem. This optimization problem should be solved at each sampling period to reject the disturbances and to ensure certain degree of robustness. An example of such optimization problem is expression (1).

$$Uopt = \arg\min J(U,x,p) \; s.t. \; g(U,x,p) <= 0 \qquad (1)$$

In expression (1), Uopt is the optimal control signal trajectory, $J(U,x,p)$ is MPC cost function, $g(U,x,p)$ represents MPC constraints, U is the optimization variable, x may be the internal state of the controlled system and p may represent various parameters. The cost function $J(U,x,p)$ may be a weighted sum of various penalties, for example, a sum of squared 2nd norms of tracking error over the prediction horizon, sum of squared 2nd norms of actuator movements, and so on. Constraints $g(U,x,p)$ may include limits for actuators and for various controlled variables over the prediction horizon.

The efficiency of the solver appears as a key factor limiting range of applications with fast sampling periods (in combination with performance of computation environment), e.g., automotive applications. Recent development of solvers for a fast MPC may enable an application of MPC technology for relatively fast automotive systems, for example, an engine air path or emissions control as it is briefly described herein. Suitable solvers for fast MPC may be based on an on-line solution or explicit solution of a parametric optimization problem (1). To achieve the best efficiency, the solvers for MPC may be standard, directly tailored for MPC or directly tailored for a particular MPC application. The on-line solvers may be based on active set (standard formulation, gradient projection, and so forth), interior point, and so on. The explicit solution may be based on multi-parametric approach, primal-dual feasibility approach, and so on.

An uncoordinated MPC control may be illustrated by the control structure shown in FIG. 4 (block or system 28). One or both controllers 21 and 31 may be implemented as an MPC. The objective of engine air path controller $K_{eng}$ 21 is to ensure that the selected controlled variables will follow their setpoints while all given constraints will be satisfied. The controlled variables 19 (engine sensors) may be, for example, any combination from the following set: boost pressure, exhaust gas recirculation flow, lambda sensor, exhaust manifold pressure, total engine air flow, turbocharger speed, and so on. The engine actuators 13 may be exhaust gas recirculation valve, turbocharger actuator, wastegate valve, throttle valve, start of injection, and so forth. The considered constraints may be, for example, upper and lower limits of actuator positions, a limit for lambda sensor, a limit for turbocharger speed, and so on. An objective for the controller $K_{scr}$ 31 is to control tailpipe emissions. A manipulated variable for $K_{scr}$ 31 may be an amount of injected urea solution 25 to the engine exhaust gas stream. Controlled variables 29 (SCR sensors) may be tailpipe emissions, namely NOx concentration 26, and PM and ammonia slip 27.

A cascaded coordinated MPC control may be illustrated structure or system 34 shown by FIG. 5. The structure may reflect the fact that the SCR system 24 is much slower that the engine air path. Therefore, it may be beneficial to configure two MPC controllers 21 and 31 in the cascade structure 34. The engine controller ($K_{eng}$) 21 may be configured to ensure basic stability of the engine air path. The additional degrees of freedom of controller 21 may be then used to influence engine exhaust gas properties so that the downstream SCR device 24 can work effectively. Controlled variables ($y_{eng}$) 19 (engine sensors) of $K_{eng}$ controller 21 may be the same as those in the uncoordinated case but it may be beneficial to add other controlled variables 17 (after-treatment sensors) which are directly related to SCR device operation and can be influenced by the engine actuators, i.e., NOx concentration and exhaust gas temperature. The SCR controller ($K_{scr}$) 31 may be configured as a coordinator of $K_{eng}$ controller 21. $K_{scr}$ controller 31 may be slower than $K_{eng}$ controller 21 and may provide setpoints 36 for $K_{eng}$ controller 21 to ensure efficient operation (NOx conversion) of SCR device 24. The controlled variables ($y_{scr}$) 29 (SCR sensors) of $K_{scr}$ controller 31 may be the same as those in the uncoordinated case, i.e., NOx concentration 26 and ammonia slip 27. The manipulated variable may be an amount of injected urea solution 25 but also a selected subset of setpoints 36 for $K_{eng}$ controller 21, e.g., engine exhaust NOx concentration 17 setpoint and engine exhaust gas temperature 17 setpoint.

The configuration, structure or system 38 is shown in FIG. 6. Control structure 38 may combine uncoordinated MPC control and cascade coordinated control. There may be two local controllers $K_{eng}$ 21 and $K_{scr}$ 31. Controllers $K_{eng}$ 21 and $K_{scr}$ 31 may be coordinated by a central coordinator or controller K 39. One, two or three of the controllers 21, 31 and 39 may be MPC controllers. The control or actuators ($u_{eng}$) 13 and controlled variables ($y_{eng}$) 19 (engine sensors) of $K_{eng}$ controller 21 may be the same as those in cascaded coordinated MPC control. The $r_{eng}$ setpoints 36 for the controlled yes signals 19 (engine sensors) may be computed by controller or coordinator K 39. A manipulated variable of controller $K_{scr}$ 31 may be an amount of injected urea solution ($u_{urea}$) 25. The controlled variables ($y_{scr}$) 29 (SCR sensors) of $K_{scr}$ controller 31 may be NOx emissions 26 and NH3 slip 27. Setpoints ($r_{scr}$) 41 for the controlled variables 29 may be computed by coordinator K 39. Coordinator K 39 may be configured so that the overall efficiency of both engine and SCR device are maximized while minimizing the operation costs.

A recap in view of FIGS. 1-6 may be noted. A selective catalytic reduction control system may incorporate a diesel engine or a model of the engine, a selective catalytic reduction exhaust after-treatment mechanism for connection to the engine, an engine controller, and a selective catalytic reduction controller connected to the selective catalytic reduction exhaust after-treatment mechanism and to the engine controller. The engine controller and the selective catalytic reduction controller may provide coordinated control of the engine and selective catalytic reduction selective catalytic reduction exhaust after-treatment mechanism to control an amount of pollutants in an exhaust emission from the engine. The items noted herein may be modeled.

The engine controller and the selective catalytic reduction controller may provide coordinated control of the engine and selective catalytic reduction exhaust after-treatment mechanism to optimize selective catalytic reduction of pollutants in the exhaust emission so as to reduce specific fuel consumption and/or particulate matter emission. The engine controller and the selective catalytic reduction controller may be model predictive controllers.

The selective catalytic reduction exhaust after-treatment mechanism may provide a catalyst into the exhaust emission for selective catalytic reduction of the pollutants in the exhaust emission. The pollutants may have NOx. The selective catalytic reduction may incorporate reducing NOx in the exhaust emission.

An amount of urea solution, which may be decomposed to ammonia injected into the exhaust emission, may be determined by a signal from the selective catalytic reduction controller. The signal may determine the amount of urea solution according to information about the pollutants in the exhaust emission. Information about the pollutants may have an indication of magnitude of NOx in the exhaust emission.

An output signal may be provided by the selective catalytic reduction controller to the engine controller. The output signal may be for indicating the information about the exhaust. The information about the exhaust may incorporate indicating an amount of NOx in the exhaust emission, exhaust mass and/or a temperature of the exhaust.

An approach for selective catalytic reduction, may incorporate providing a first model of a diesel engine and associated components, a second model of an exhaust after-treatment device coupled to an exhaust of the first model of the diesel engine, an engine controller connected to the first model of the diesel engine, and a selective catalytic reduction controller connected to the second model of the exhaust after-treatment device. The approach may also incorporate simulating a treating an exhaust of the first model with selective catalytic reduction as provided by the second model to reduce pollutants in the exhaust, simulating an operation of the first model to increase fuel efficiency, and coordinating the first and second models in conjunction with the first and second controllers, respectively, to allow for a reduction of pollutants and an increase the fuel efficiency. The controllers may be model predictive controllers.

A selective catalytic reduction of pollutants may incorporate injecting a prescribed amount of urea solution into the exhaust. The prescribed amount of urea solution may be determined by coordinated control of the first and second models and the selective catalytic reduction to allow for the reduction of pollutants such as NOx, and increased fuel efficiency of the engine.

The approach may further incorporate obtaining information about a reduction of the amount of NOx with ammonia decomposed from the urea solution. The amount of urea solution provided to the exhaust may be prescribed according to the information about the reduction of NOx with ammonia decomposed from the urea solution.

An engine emissions reduction system may incorporate an exhaust after-treatment device, and a system controller connected to the exhaust after-treatment device. The exhaust after-treatment device may incorporate a coupling for connection to an exhaust of a diesel engine. The system controller may be connected to the engine and to the exhaust after-treatment device. The system controller may coordinate control of the engine and the exhaust after-treatment device to provide selective catalytic reduction of polluting emissions from the engine.

The system controller may incorporate a supervisory controller, an engine controller connected to the supervisory controller and the engine, and a selective catalytic reduction controller connected to the supervisory controller and the exhaust after-treatment device. The system controller may coordinate control of the engine and the exhaust after-treatment device to further provide increased fuel efficiency of the engine. The polluting emissions may have NOx. The selective catalytic reduction may neutralize the NOx with an addition of urea solution to the emissions.

The controllers may be model predictive controllers. The selective catalytic reduction controller may provide a signal indicating an amount of urea solution to be provided to the polluting emissions. The signal may be conveyed to the exhaust after-treatment device for releasing the amount of urea solution into the polluting emissions exhaust of the engine. At an exhaust output downstream from the exhaust after-treatment device, the amount of urea solution released into the exhaust may be determined by the signal from the selective catalyst reduction controller that indicates the amounts of NOx and NH3 in the exhaust and amounts of NOx and NH3 permitted in the exhaust by applicable regulations on emissions.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A selective catalytic reduction control system comprising:
    a diesel engine;
    a plurality of engine actuators configured to govern one or more functions of the diesel engine;
    a selective catalytic reduction exhaust after-treatment mechanism for connection to the diesel engine;
    an engine controller according to a diesel engine model having a first time constant; and
    a selective catalytic reduction controller according to a selective catalytic reduction exhaust after-treatment mechanism model having a second time constant greater than the first time constant, connected to the selective catalytic reduction exhaust after-treatment mechanism and to the engine controller; and wherein:
    the engine controller and the selective catalytic reduction controller provide coordinated control of the diesel engine and selective catalytic reduction exhaust after-treatment mechanism to control an amount of pollutants in an exhaust emission from the diesel engine;
    an output signal is provided by the selective catalytic reduction controller to the engine controller;
    the output signal controlling setpoints for an amount of NOx in the exhaust emission, temperature of the exhaust, and exhaust mass; and
    an input signal is provided by the engine controller to the engine actuators to control the diesel engine to produce an exhaust emission with the amount of NOx, the temperature, and the mass indicated by the setpoints.

2. The system of claim 1, wherein the engine controller and the selective catalytic reduction controller provide coordinated control of the diesel engine and selective catalytic reduction exhaust after-treatment mechanism to optimize selective catalytic reduction of pollutants in the exhaust emission so as to reduce at least one of specific fuel consumption and particulate matter emission.

3. The system of claim 1, wherein:
the engine controller is a model predictive controller; and
the selective catalytic reduction controller is a model predictive controller.

4. The system of claim 2, wherein the selective catalytic reduction exhaust after-treatment mechanism provides a catalyst into the exhaust emission for selective catalytic reduction of the pollutants in the exhaust emission.

5. The system of claim 4, wherein:
the pollutants comprise NOx; and
the selective catalytic reduction comprises reducing NOx in the exhaust emission.

6. The system of claim 4, wherein:
an amount of urea solution, which is decomposed to ammonia, injected into the exhaust emission is determined by a signal from the selective catalytic reduction controller; and
the signal determines the amount of urea solution according to information about the pollutants in the exhaust emission.

7. The system of claim 6, where the information about the pollutants comprises an indication of magnitude of NOx in the exhaust emission.

8. An engine emissions reduction system comprising:
an exhaust after-treatment device; and
a system controller connected to the exhaust after-treatment device; and wherein:
the exhaust after-treatment device comprises a coupling for connection to an exhaust of a diesel engine;
the system controller is connected to the diesel engine and to the exhaust after-treatment device;
the system controller coordinates control of the diesel engine and the exhaust after-treatment device to provide selective catalytic reduction of polluting emissions from the diesel engine; and the system controller comprises:
a supervisory controller;
an engine controller according to a diesel engine model having a first time constant connected to the supervisory controller and a plurality of actuators of the diesel engine; and
a selective catalytic reduction controller according to an exhaust after treatment device model having a second time constant greater than the first time constant connected to the supervisory controller and the exhaust after-treatment device; and wherein the supervisory controller receives feedback from engine sensors and selective catalytic reduction sensors and provides one or more engine emissions setpoint parameters to the engine controller and the selective catalytic reduction controller provides a signal indicating an amount of urea solution to be provided to the polluting emissions based on the one or more engine emissions setpoint parameters provided to the engine controller.

9. The system of claim 8, wherein the system controller coordinates control of the diesel engine and the exhaust after-treatment device to further provide increased fuel efficiency of the diesel engine.

10. The system of claim 9, wherein:
the polluting emissions comprise NOx; and
the selective catalytic reduction neutralizes the NOx with an addition of urea solution to the emissions.

11. The system of claim 8, wherein the controllers are model predictive controllers.

12. The system of claim 10, wherein:
the selective catalytic reduction controller provides a signal indicating an amount of urea solution to be provided to the polluting emissions; and
the signal is conveyed to the exhaust after-treatment device for releasing the amount of urea solution into the polluting emissions exhaust of the diesel engine.

13. The system of claim 12, wherein at an exhaust output downstream from the exhaust after-treatment device, the amount of urea solution released into the exhaust is determined by the signal from the selective catalyst reduction controller, and wherein the selective catalyst reduction controller further indicates the amounts of NOx and NH3 in the exhaust and amounts of NOx and NH3 permitted in the exhaust by applicable regulations on emissions.

14. An engine emissions reduction mechanism comprising:
an exhaust after-treatment device; and
a system controller connected to the exhaust after-treatment device; and wherein:
the exhaust after-treatment device comprises a coupling for connection to an exhaust of a diesel engine;
the system controller is connected to the diesel engine and to the exhaust after-treatment device;
the system controller controls the diesel engine according to a diesel engine model predictive controller having a first time constant;
the system controller controls the exhaust after-treatment device according to an exhaust after-treatment device model predictive controller having a second time constant greater than the first time constant, wherein an input to the diesel engine model predictive controller is based on an output of the exhaust after-treatment model predictive controller; and
the system controller coordinates control of the diesel engine and the exhaust after-treatment device to provide selective catalytic reduction of polluting emissions from the engine.

15. The mechanism of claim 14, wherein the system controller comprises:
a supervisory controller;
an engine controller connected to the supervisory controller and the diesel engine; and
a selective catalytic reduction controller connected to the supervisory controller and the exhaust after-treatment device.

16. The mechanism of claim 14, wherein the system controller coordinates control of the engine and the exhaust after-treatment device to further provide increased fuel efficiency of the diesel engine.

17. The mechanism of claim 16, wherein:
the polluting emissions comprise NOx; and
the selective catalytic reduction neutralizes the NOx with an addition of urea solution to the emissions.

18. The mechanism of claim 15, wherein the controllers are model predictive controllers.

19. The mechanism of claim 15, wherein:
the selective catalytic reduction controller provides a signal indicating an amount of urea solution to be provided to the polluting emissions; and
the signal is conveyed to the exhaust after-treatment device for releasing the amount of urea solution into the polluting emissions exhaust of the diesel engine.

* * * * *